United States Patent
Dainez

(10) Patent No.: US 7,211,981 B2
(45) Date of Patent: May 1, 2007

(54) ELECTRIC MOTOR MOVEMENT CONTROLLING METHOD, AN ELECTRIC MOTOR MOVEMENT CONTROLLING SYSTEM AND A COMPRESSOR

(75) Inventor: Paulo Sérgio Dainez, Joinville (BR)

(73) Assignee: Empresa Brasileira de Compressores S.A. - Embraco, Joinville-SC (BR)

( * ) Notice: Subject to any disclaimer, the term of this patent is extended or adjusted under 35 U.S.C. 154(b) by 0 days.

(21) Appl. No.: 10/564,581

(22) PCT Filed: Jul. 14, 2004

(86) PCT No.: PCT/BR2004/000114

§ 371 (c)(1),
(2), (4) Date: Jun. 9, 2006

(87) PCT Pub. No.: WO2005/006537

PCT Pub. Date: Jan. 20, 2005

(65) Prior Publication Data

US 2007/0001630 A1    Jan. 4, 2007

(30) Foreign Application Priority Data

Jul. 15, 2003    (BR) ................................. 0302419

(51) Int. Cl.
*G05B 11/36*    (2006.01)
(52) U.S. Cl. ...................... 318/609; 318/632; 318/254; 318/138; 318/439
(58) Field of Classification Search ............ 318/254, 318/138, 439, 500, 432, 632, 109, 609, 610
See application file for complete search history.

(56) References Cited

U.S. PATENT DOCUMENTS

| 4,300,083 A * | 11/1981 | Heiges ........................ 318/686 |
| 5,216,587 A * | 6/1993 | Miyazaki et al. ........ 363/56.02 |
| 5,325,037 A | 6/1994 | Jeong |
| 5,450,521 A | 9/1995 | Redlich |
| 6,280,147 B1 | 8/2001 | Kilayko et al. |
| 6,285,146 B1 * | 9/2001 | Harlan ........................ 318/254 |

FOREIGN PATENT DOCUMENTS

EP    0 312 686 A2    4/1989

* cited by examiner

*Primary Examiner*—Rina Duda
(74) *Attorney, Agent, or Firm*—Alston & Bird LLP

(57) ABSTRACT

The present invention provides an electric motor movement controlling method, where the electric motor is fed by a total voltage proportional to the network voltage. The method comprises steps of making a first measurement of level of the network voltage at a first moment of measurement and making a second measurement of level of the network voltage; at a second moment of measurement, calculating the value of the derivative of the values of voltage measured in function of the first and second moments of measurement, to obtain a value of a proportional network voltage, and altering the value of the total voltage fed to the motor, proportionally to the value of the proportional network. A system that will implement the steps of the method of the present invention, as well as a compressor comprising the system of the present invention are foreseen.

26 Claims, 5 Drawing Sheets

ELECTRIC MOTOR MOVEMENT CONTROLLING METHOD, AN ELECTRIC MOTOR MOVEMENT CONTROLLING SYSTEM AND A COMPRESSOR

The present invention relates to an electric motor movement controlling method, an electric motor movement controlling system, as well as to a compressor provided with a system according to the present invention.

DESCRIPTION OF THE PRIOR ART

Electric motor movement controlling systems are already known from the prior art.

Control of electric motor movements is particularly important in controlling motors applied to linear compressors, since with the latter the stroke of the respective piston is not previously established. Because of this constructive characteristic, the piston may collide with the respective stroke end under certain circumstances, which undesirably results in noise, damages to the performance of the compressor or even the breaking of the compressor.

A control of movements of electric motors usually monitors the internal variables of the equipment itself, for instance, the position of the piston inside a cylinder, the capacity required for reaching a determined motor demand. Systems of this nature may comprise, for example, compressors coupled to cooling systems, wherein it is necessary to monitor the cooling capacity of the compressor, and further prevent the respective piston from colliding the stroke end, if cooling capacity suddenly changes.

Examples of this type of technique may be found in the documents U.S. Pat. Nos. 5,432,176; 5,496,153; 5,450,521; and 5,592,073. According to the teachings of this technique, a control over the piston stroke is used, which constitutes a controller of the voltage imposed on the linear motor, re-fed by information about the piston position, basically estimated from the current information supplied to the motor and the voltage induced at the motor terminals.

In these solutions, the piston stroke is controlled by taking the estimated position of the piston as a reference, which is calculated from the current and voltage at the motor terminals, but which leads to errors because of constructive variations of the motor, variations in temperature, which limits the efficiency and the operation under extreme conditions of cooling capacity. Another deficiency of this type of solution is that the calculation of the average movement point of the piston is imprecise, basically caused by the average difference between the suction pressure and the discharge, and the elastic constant of the spring of the resonant system.

In cooling applications, for example, during the functioning, the electric motor together with the compressor will be subjected to various types of transients, such as opening the door of the cooling system, change of thermal charge, variation in the ambient temperature, opening or closing valves in the system, all of these thermo-mechanical transients have time constants that are slow in comparison with the response time of the control, and do not cause disturbance in the displacement of the compressor, since the control manages to actuate before any effect is noticed.

The most abrupt phenomena to which the system will be subjected, are disturbances in the network voltage, and these disturbances may affect the functioning of the compressor and, depending upon the condition of the compressor functioning and upon amplitude of the disturbance, a mechanical impact of the piston with the cylinder top may occur.

None of the proposed solutions analyzes the variations in network voltage and, therefore, they cannot guarantee for sure that the system will correct in time the disturbances in the network, preventing the mechanical impact and oscillations on the maximum displacement that impair the efficiency of the system.

OBJECTIVE AND BRIEF DESCRIPTION OF THE INVENTION

The proposed solution has the following objectives:

Controlling the voltage level applied to electric motors in general;

Controlling the movement of the piston of a linear motor;

Monitoring the voltage level of the electric network directly and concluding whether the voltage level applied to the motor should be altered or not;

Controlling the stroke of the piston of a linear compressor, allowing the piston to advance as far as the end of its mechanical stroke, even under conditions of extreme load, without allowing the piston to collide against the cylinder top, even in the presence of external disturbances from the energy feed network;

Controlling the stroke of the piston of a linear compressor, preventing oscillations in the maximum displacement of the piston, which impair the efficiency of the compressor, for any operation capacity of the compressor, even in the presence of external disturbances from the energy feed network;

Implementing a simple solution for industrial-scale production.

These objectives are achieved by means of a method of controlling the movements of an electric motor, the electric motor being fed by a total voltage proportional to a network voltage, the method comprising the steps of: making a first measurement of the level of the network voltage at a first moment of measurement; making a second measurement of the level of network voltage at a second moment of measurement; calculating the value of the derivative of the voltage values measured in function of the first and the second moments of measurement, in order to obtain a value of a proportional network voltage; and altering the value of the total voltage fed to the motor, proportionally to the value of the value of the proportional network voltage.

The method further comprises steps of altering the value of the total voltage in function of the difference between the value of the proportional network voltage calculated in a present cycle of the network voltage and the value of the proportional network voltage calculated in the previous cycle of the network voltage; or altering the value of the total voltage in function of the difference between the value of the proportional network voltage calculated in a present semi-cycle of the network voltage and the value of the proportional network voltage calculated in the previous semi-cycle of the net-network voltage.

A further objective of the present invention is achieved by means of an electric motor movement controlling method, the electric motor being fed by a total voltage proportional to the network voltage, the method comprising the steps of: measuring the network voltage at a first moment of measurement; measuring the network voltage at a second moment of measurement, the second moment of measurement being different from the first moment of measurement and the second measurement of the network voltage being carried out at a voltage level different from the level of the first measurement of the network voltage; measuring the lag time between the occurrence of the measurement of the first moment of measurement and the occurrence of the measurement of the second moment of measurement; comparing the lag time with the pre-established time; altering the value of the total voltage proportionally to the value of the proportional network voltage.

Still a further objective of the is achieved by means of an electric motor movement controlling system controlled by an electronic control central, the electric motor being fed by a total voltage controlled by the electronic control central, the total voltage being proportional to the network voltage, the electronic control central comprising a voltage-detecting circuit, the voltage-detecting circuit detecting the network voltage, the electronic control central measuring a first measurement of level of the network voltage at a first moment of measurement, and measuring a second measurement of level of the network voltage at a second moment of measurement; the electronic control central calculating the value of the derivative of the values of the network voltage measured in function of the times of measurement measured and obtaining a value of a proportional network voltage; the electronic control central altering the value of the total voltage to a value of corrected total voltage, proportionally to the value of the proportional network voltage.

BRIEF DESCRIPTION OF THE DRAWINGS

The present invention will now be described in greater detail with reference to an embodiment represented in the drawings. The figures show.

DETAILED DESCRIPTION OF THE FIGURES

The present invention relates to a system, as well as a method of controlling an electric motor, being particularly applicable for controlling movements of a piston in a linear compressor.

Figure 1:
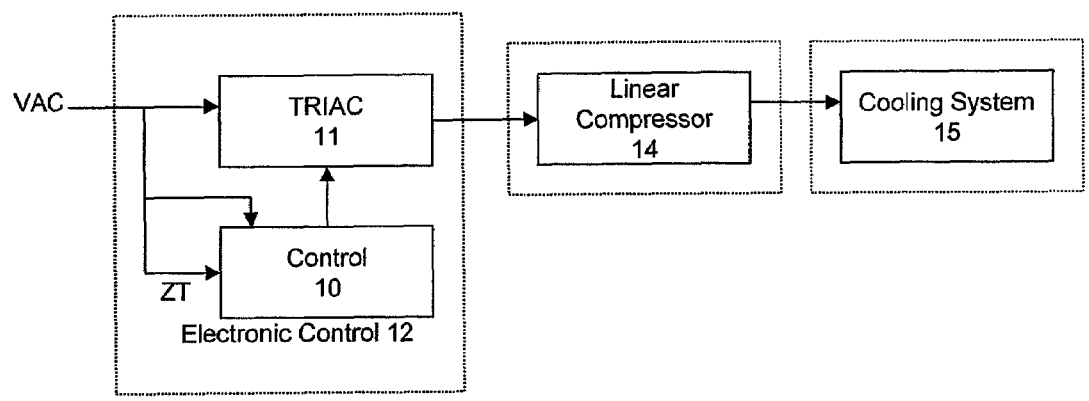
FIG. 1 is a block diagram of the system of the present invention, illustrating the respective interconnection upon application to a compressor and a cooling system.
Figure 2:
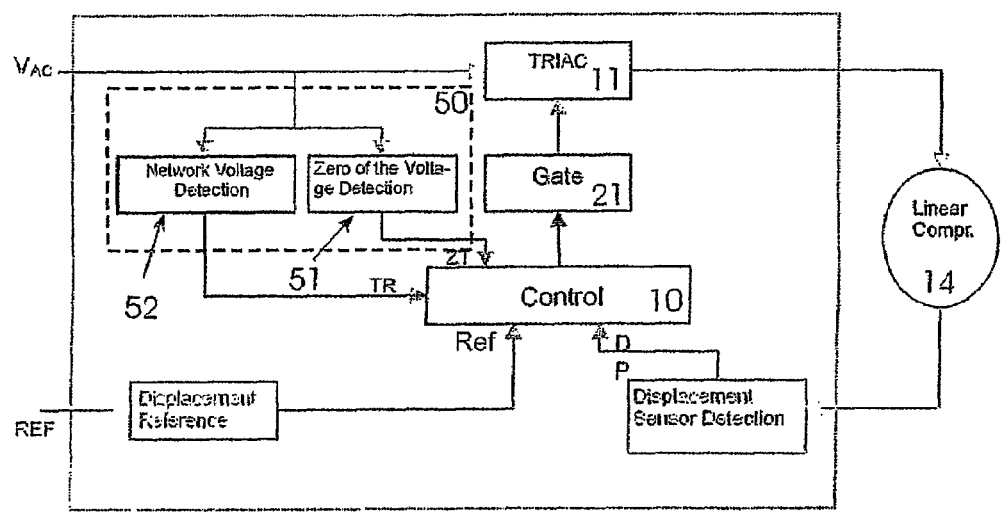
FIG. 2 is a block diagram of the system of controlling the movement of a piston according to the present invention upon application to a linear compressor.

As can be seen in FIGS. 1 and 2, the system of controlling movements of a piston according to the present invention comprises an electronic control 12, which monitors a network voltage $V_{AC}$ and controls a total voltage $V_T$ applied to an electric motor that drives a compressor 14, which may be applicable to a cooling system 15.

The electronic control 12, comprises an electronic control central 10 which, by means of a gate circuit 21 controls the conduction time of a switch set 11 (preferably TRIACS), to control the total voltage level $V_T$.

In FIG. 2, one can see that the control system of the present invention comprises, associated to the electronic control central 10, a voltage detecting circuit 50, which is electrically connected to the network voltage $V_{AC}$, so that the respective value will be measured before its level is controlled by the switch set 11.

With this configuration the electronic control central 10 can control the level of the total voltage $V_T$ applied to the motor, proportionally to the level of the network voltage $V_{AC}$, and thereby prevent the occurrence of an overvoltage or undervoltage in the feed network, that might cause the compressor 14 to behave in an unexpected way.

Figure 3:
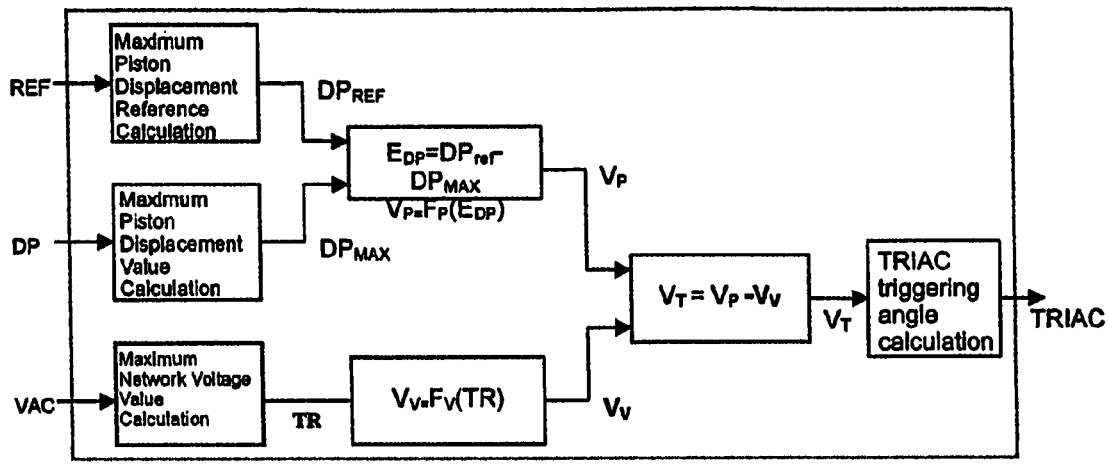
FIG. 3 is a block diagram of the algorithm for control of the system for controlling the movement of a piston of the present invention.
Figure 4:
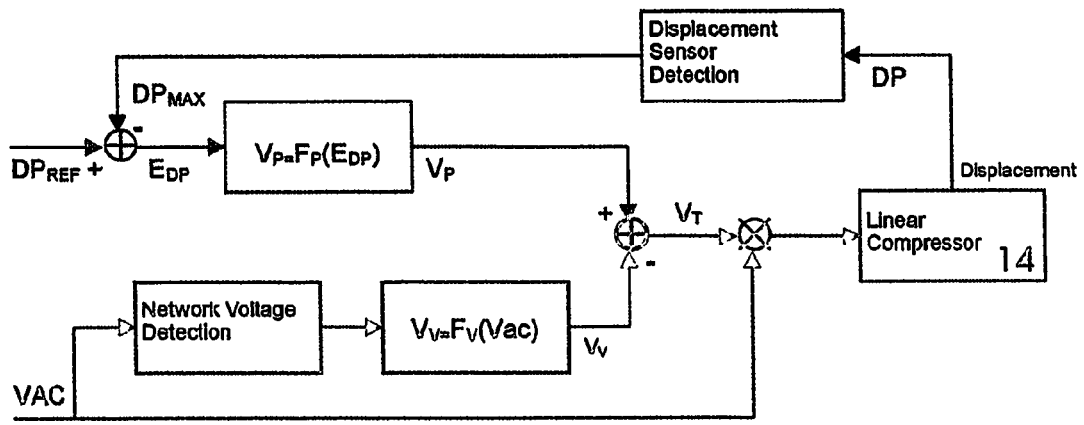
FIG. 4 illustrates the control network of the system of controlling the movement of a piston of the present invention.

In order to implement the use of the system and monitor the network voltage $V_{AC}$ and thus decide whether to interfere or not in the level of the total voltage $V_T$, one should implement the control algorithm illustrated in FIG. 3, according to the control network illustrated in FIG. 4.

As can be seen in FIG. 3, the value of the total voltage $V_T$ comprises the sum or subtraction of a value of a piston voltage $V_P$ and a correction voltage $V_V$ from the equation:

$$V_T = V_P \pm V_V.$$

The value of the piston voltage $V_P$ is obtained from the values supplied by an external device, for example, a reference signal REF, which may indicate to which extent the compressor piston should be moved, especially in the cases where the teachings of the present invention are applied on linear compressors, since in the latter the cooling capacity will depend upon the excursion amplitude of the respective piston. The value of the reference signal may be a DC level transmitted to the electronic control device 10. In this way, and position of reference $DP_{REF}$ of the piston is established.

Another variable necessary to establish the value of the piston voltage $V_P$ is obtained by calculating the maximum desirable excursion point which the piston should advance without the risk of the latter colliding at the respective stroke end. Preferably, the value of the piston voltage $V_P$ is obtained by storing the value of the piston voltage $V_P$ of the previous cycle. The value of maximum displacement $DP_{MAX}$ should, therefore, be previously established based on the characteristics of the compressor 14.

Once the values of reference displacement $DP_{REF}$ and maximum displacement $DP_{MAX}$ have been obtained, the value of the piston voltage $V_P$ can be obtained, since the latter is a function of the difference between the values obtained, that is to say, between the calculated error $E_{DP}$.

The other component of the total voltage $V_T$, the value of the correction voltage $V_V$, will be obtained according to the teachings of the present invention, by comparing the value of the network voltage $V_{AC}$ with a previously established value to conclude that there is a need for correction of the respective value, that is to say, the value of the correction voltage $V_V$ will be the difference itself between the voltage expected to be read and the network voltage $V_{AC}$. In this way, in the cases where the value of the network voltage $V_{AC}$ is within the expected limits, the value of the correction voltage $V_V$ will be null, since there is no need to alter the value of the network voltage $V_{AC}$.

Figure 8:
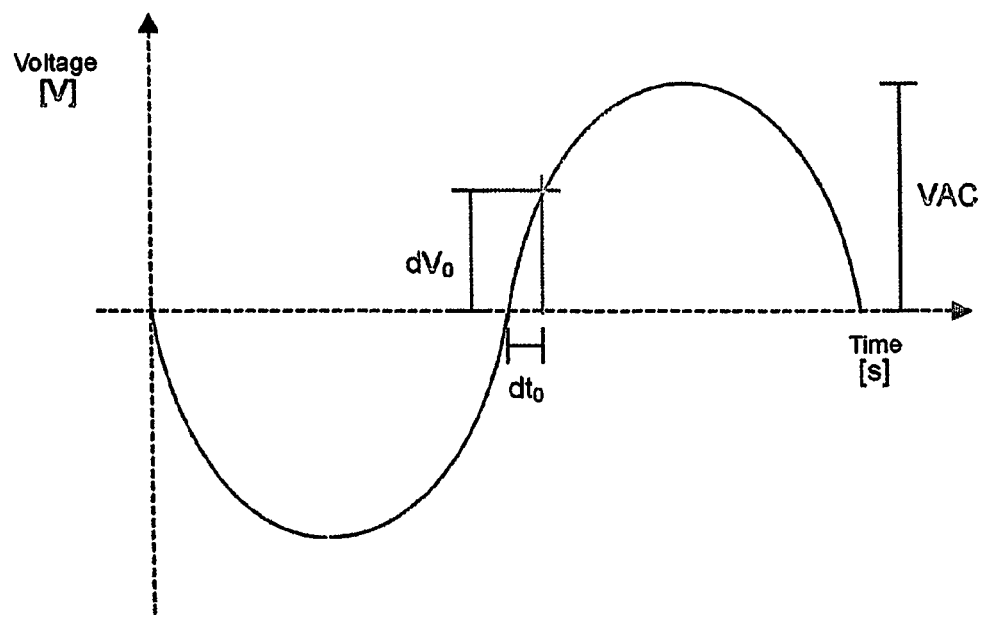
FIG. 8 illustrates the points where the network voltage is measured according to the teachings of the present invention.
Figure 9:
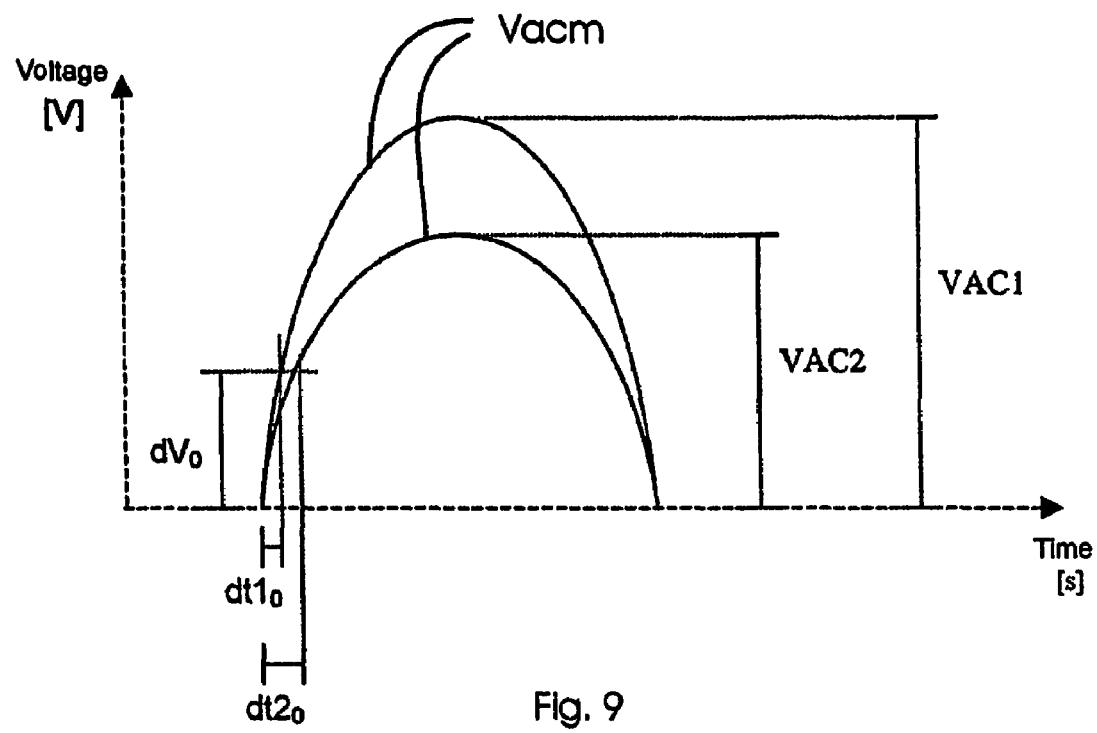
FIG. 9 illustrates two different situations of network voltage, and the points of measurement made.

As can be seen in FIGS. 8 and 9, this measurement principle is carried out by adopting a fixed value of voltage $V_0$ (or established voltage level $V_0$) and counting the required time for the network voltage VAC to reach this level. This, in reality, is the same as measuring the derivative of the network voltage $V_{AC}$ close to zero, to estimate the value of the network voltage.

Putting this into equations, the following conclusion is reached:

$$V_{AC} = f\left(\frac{\partial V_0}{\partial t}\right), \; V_{AC} \text{ being proportional to } \frac{\partial V_0}{\partial t_0}$$

For constant $\partial V_0$:

$$V_{AC} = f\left(\frac{1}{\partial t}\right)$$

$V_{AC}$ is inversely proportional to $\partial t_0$ $$V_{AC1} = f\left(\frac{\partial V_0}{\partial t 1_0}\right)$$

$$V_{AC2} = f\left(\frac{\partial V_0}{\partial t 2_0}\right)$$

For constant $\partial V_0$:

$$V_{AC1} = f\left(\frac{1}{\partial t 1_0}\right)$$

$$V_{AC2} = f\left(\frac{1}{\partial t 2_0}\right)$$

Thus, one may conclude that the value of the above demonstrated network voltage $V_{AC}$ may be calculated on the basis of the established voltage level $V_0$ and by taking as a reference the value $V_{AC1}$ and $V_{AC2}$ illustrated in FIG. 9. In this way, by taking, for instance, the value of $V_{AC1}$ as a reference, one may conclude that the value $V_{AC2}$ would be below the level of network voltage $V_{AC}$ desired for a determined application, and the value of the total voltage $V_T$ should be corrected. The value $V_{AC}$ taken as a reference will be the value of voltage of the previous cycle or the mean of the previous cycles, which results in that the value of the voltage taken as a reference will not be constant, since the objective is to correct an oscillation of a cycle of the network for the next cycle.

As demonstrated above, considering that for a constant voltage level by adopting the established voltage level $V_0$ equal for the two measures, thus having constant $\partial V_0$, it is sufficient to measure only the time passed between two points measured by the voltage detecting circuit 50 and to detect which is the real voltage level from an equation or table of values.

In order to reach the voltage value necessary to correct the total voltage $V_T$, the value of the correction $V_V$ should be obtained, which, in practice, will be a proportional network voltage $V_{AC}'$; on the other hand, the respective value will be directly related to the value of the input voltage $V_{AC}$. In the same way as explained above, the value of the network voltage $V_{AC}$ should be obtained from measurements of the previous network voltage $V_{AC}$, or from the mean of the measurements of the previous network voltages $V_{AC}$.

Mathematically, the value of the proportional network voltage $V_{AC}'$ is reached by the following operation:

$$V_{AC}' = f\left(\frac{\partial V_0}{\partial t}\right)$$

As can be seen from the equation, the value of the proportional network voltage $V_{AC}'$ is obtained by means of the derivative of voltage values obtained in function of the time passed between the measurements.

Figure 10:
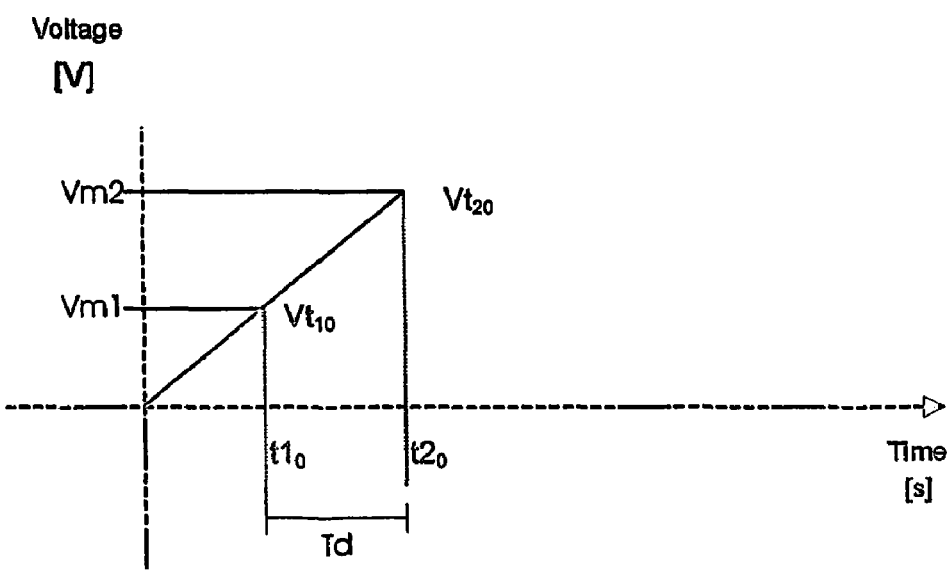
FIG. 10 illustrates a particular situation where the teachings of the present invention are applied.

In order to implement such an equation in practice, it is enough to carry out two measurements of voltage and two measurements of time, as exemplified in FIG. 10, so that one can proceed with the respective derivative, that is to say, one should preferably measure the network voltage $V_{AC}$ at a first moment of measurement $t1_0$ to define a first measurement of level $V_{t0}$ and then measure the network voltage $V_{AC}$ at a second moment of measurement $t2_0$, defining a second measurement of level $V_{t20}$.

Once these values have been obtained, one proceeds with the equation below:

$$V_{AC}' = f\left(\frac{V_{t20} - V_{t10}}{t2_0 - t1_0}\right)$$

that is to say, by subtracting from the first and second measurements of level $V_{t10}$, $V_{t20}$ and dividing the result by the subtraction of the values of the first and second moments of measurement $t1_0$, $t2_0$, and the value $\partial t$ is obtained by subtracting the values of the first and second moments of measurement $t1_0$, $t2_0$.

From this control algorithm the readings of the input voltage should be stored at every semi-cycle of the network voltage $V_{AC}$ and compare the present reading with the previous one (or with the previous ones), and alter the value of the output to compensate for the network voltage $V_{AC}$, thus preventing a variation in the maximum piston displacement from occurring, since this variation might lead to a mechanical impact of the piston with the cylinder top or to a loss of efficiency of the system.

For instance, one may opt for carrying out a number of measurements on different cycles of network voltage $V_{AC}$ and store the obtained values in the electronic control central 10, carrying out the derivative of the obtained values subsequently in order to reach a value of the proportional network voltage $V_{AC}'$.

In order to implement the use of the concepts of the present invention, a method is provided by which the network voltage $V_{AC}$ can be monitored and conclude that there is a need to make some adjustment in the level of the total voltage $V_T$.

The method includes the steps of measuring the network voltage $V_{AC}$ at a first moment of measurement $t1_0$, and designated such a measurement as first level measurement $V_{t10}$.

Then the network voltage $V_{AC}$ should be measured at a second moment of measurement $t2_0$. In the same way, the value of these measurements may be designated as a second level measurement $V_{t20}$.

Once these values are obtained as described above, the value of the derivative of the voltage values is calculated and measured in function of the measurement times $t1_0$, $t2_0$, to obtain the value of a proportional network voltage $V_{AC}'$ and, finally, alter the value of the total voltage $V_T$ fed to the motor proportionally to the value of the proportional network voltage $V_{AC}'$.

One of the ways of proceeding, in practice, with the step of obtaining the value of the proportional network voltage $V_{AC}'$ may be by means of the following steps:

A lag time $t_D$ is measured between the occurrence of the measurement of the first moment of measurement $t1_0$ and the occurrence of the measurement of the second moment of measurement $t2_0$. In this way, one can know which maximum level of the network voltage $V_{AC}$ is required in order to conclude that there is a need for correction in the value of the total voltage $V_T$.

For this purpose, it is enough to compare the lag time $t_D$ with a pre-established time $t_P$, the latter being determined by the electronic control central 10, and one may proceed with the elevation of the total voltage $V_T$ if the lag time $t_D$ is longer than the pre-established time $t_P$, or with reduction of the total voltage $V_T$ if the lag time to is shorter than the pre-established time $t_P$.

In practice, it is recommendable to consider the value of the pre-established time $t_P$ as the measurement of the lag time $t_D$ of the previous cycle or the mean of the previous cycles.

The simple comparison of the lag times $t_D$ with the pre-established time $t_P$ is opted when the conditions are more appropriate for this, but one may carry out the above steps when the circuits used in the embodiment demand the need to proceed with the derivative described before.

As far as the system for implementing the method of the present invention is concerned, it should comprise the electronic control central 10 to control the electric motor and the voltage detecting circuit 50 to measure the value of the network voltage $V_{AC}$.

As described in the method, the electronic control central 10 will make the first level measurement $V_{t10}$ of the network voltage $V_{AC}$ at a first moment of measurement $t1_0$, making the second level measurement $V_{t20}$ of the network voltage $V_{AC}$ at the second moment of measurement $t2_0$, and these measurements may be carried out as times goes by and as the cycles of the network voltage $V_{AC}$ take place.

The derivative of the values of the network voltage $V_{AC}$ measured in function of the times of measurement $t1_0$, $t2_0$ measured and the obtention of the value of the proportional network voltage $V_{AC}'$ will be carried out by the electronic control central 10, which, in function of the value of the network voltage $V_{AC}$ will alter the value of the total voltage $V_T$ to a value of corrected total voltage $V_T'$ to prevent the piston from going beyond the foreseen point and to prevent impacts.

The voltage detecting circuit 50 should comprise the first voltage detecting circuit 51 to detect the first level of network voltage $V_{M1}$ and the second voltage detecting circuit 52 to detect the second level of the network voltage $V_{M2}$.

Preferably, the first voltage detecting circuit 51 is adjusted to measure the first level of network voltage $V_{M1}$ at the time of the respective passage by a zero level (or zero of the voltage ZT) and the second voltage detecting circuit 52 to measure the second level of network voltage $V_{M2}$ between the zero level of the network voltage $V_{AC}$ and the maximum level of the network voltage $V_{ACM}$. In this way, two different measurements of level are obtained, and thus it is possible to proceed with the derivative of the measured values.

The lag time $t_D$ is registered between the occurrence of the measurement of the first level of the network voltage $V_{M1}$ and the occurrence of the measurement of the second level of the network voltage $V_{M2}$. These measurements are carried out by the voltage detecting circuit 50, which will transmit the respective occurrences to the electronic control central 10. A time counting device comprised in the electronic control 12 compares the lag time $t_D$ with the pre-established time $t_P$, and alters the total voltage $V_T$ proportionally to the lag time $t_D$. The value of the total voltage $V_T$ will be raised to a value of corrected total voltage $V_T'$ if the lag time $t_D$ is longer than the pre-established time $t_P$ and reduced to a value of corrected total voltage $V_T'$ is the $t_D$ is shorter than the pre-established time $t_P$. When the value of the lag time $t_D$ is equal to the pre-established time, it will not be necessary to make an alteration in the total voltage $V_T$, since, in this case, the network voltage $V_{AC}$ will be in ideal conditions. In other words, in these conditions, when the lag time $t_D$ is null, the value of the total voltage $V_T$ will be the value of the piston voltage $V_P$.

Figure 5:
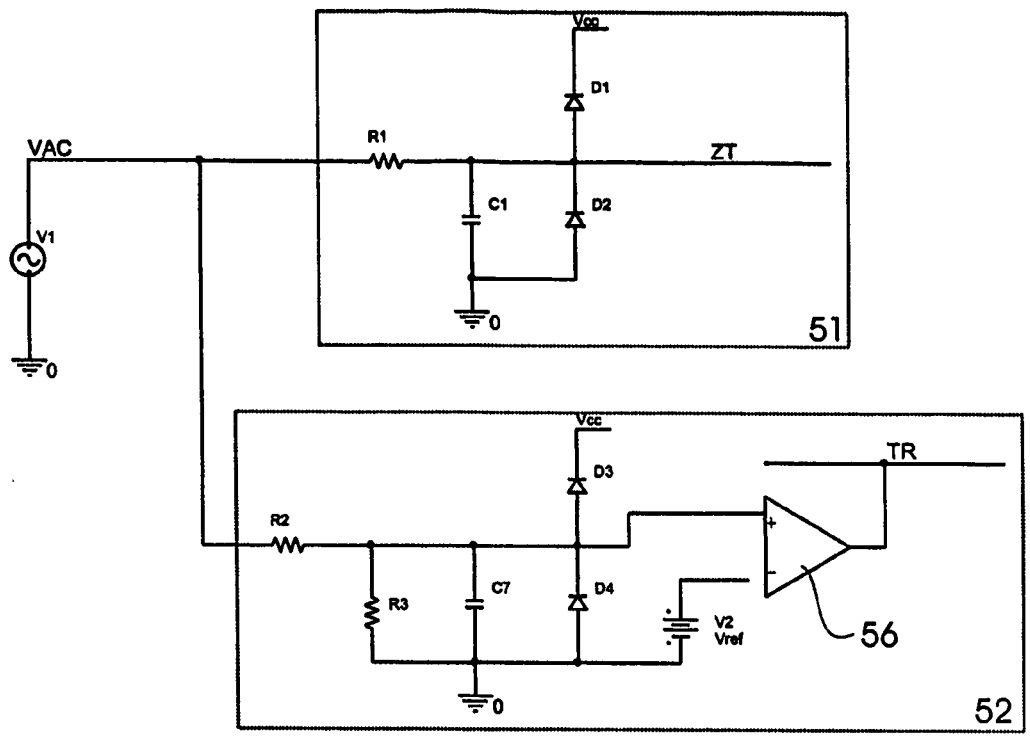
FIG. 5 is an electric diagram of a voltage-detecting circuit used in the system of the present invention.

Within the teachings of the present invention, one can see in FIGS. 2 and 5 that the first and second voltage detecting circuits 51, 52 are directly connected to the network voltage $V_{AC}$, the respective outputs ZT and TR being fed to the electronic control device 10.

Figure 6:
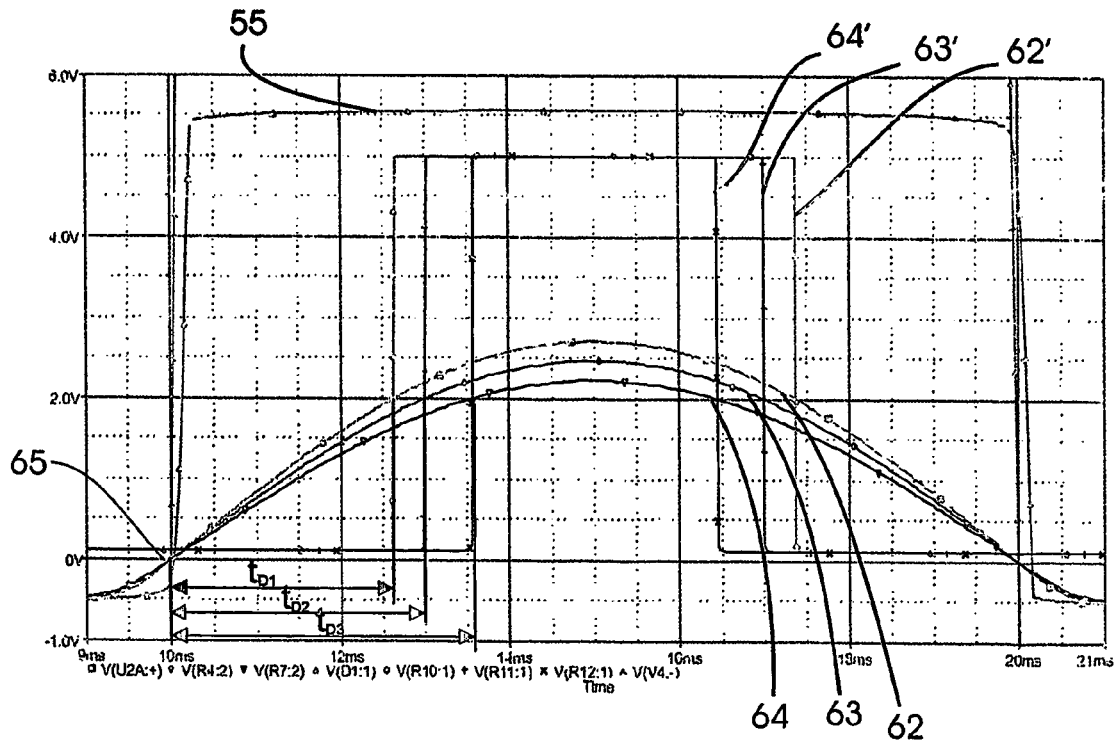
FIG. 6 shows a graph of an input and output signal of the generator by the voltage-detecting circuit, for various levels of input voltage (nominal voltage, nominal voltage +10%, nominal voltage −10%)

The first voltage detecting circuit should preferably be configured as illustrated in FIG. 5, that it so say, a configuration where the zero level of the voltage ZT of the network voltage $V_{AC}$ is detected. In this case, the output ZT of this circuit will oscillate between 0 V and Vcc, which in the example of FIG. 6 is of 5V, a difference existing between the value of 5V and the read signal (see curve 55) due to the drop in voltage on the diode D1 (Scales 0.5 V/div–0.5 ms/div). In this way, the signal ZT may be directly interpreted by the electronic control circuit 10.

The second voltage detection circuit 52 comprises a voltage divider $R_2/R_3$, which lowers the level of the network voltage $V_{AC}$ to an adequate level to be processed by the electronic control central 10. This may be seen in the curves illustrated in FIG. 6, which correspond, respectively, to the measurements made with voltage levels of 242V (see curve 62), 220V (see curve 63) and 198V (see curve 64), these curves illustrating, respectively, a situation of $V_{AC}$ in overvoltage, expected voltage and undervoltage, and the value of the voltage VT should be mediated/corrected whenever there is oscillation from a cycle to another.

A comparator 56 of the second voltage detecting circuit 52 will detect the passage of the level of the network voltage $V_{AC}$ by a point that is pre-determined and controlled by the reference voltage Vref, to signalize at the output TR that the reference voltage level has been reached. The result of this is the generation of square waves 62', 63' and 64', which correspond, respectively, to the values of the network voltage $V_{AC}$ measured. The comparator 56 may be embodied, for instance, by using an operational amplifier or another type of equivalent device.

The voltage comparator 53 will generate a square wave having a transition moment, the lag time $t_D$ being measured between the occurrence of the first level of the network voltage $V_{M1}$ and the transition moment.

This may be observed in FIG. 6, where the lag times $t_{D1}$, $t_{D2}$, $t_{D3}$ are illustrated, and which correspond to the examples of voltage at a level of 242V (curve 62), 220V (curve 63) and 198V (curve 64), respectively.

The voltage values measured by the first and second voltage detecting circuits 51, 52 correspond to the first level of the network voltage $V_{M1}$ and to the second level of network voltage $V_{M2}$ described above, and are interpreted in the way foreseen in the method of the present invention. One can see, in this example, that the value of the first level of the network voltage $V_{M1}$ is equal to zero (see indication with reference 65 in FIG. 6).

With respect to the first and second moments of measurement $t1_0$, $t2_0$, they will be registered from the moment of detection of the zero level of the voltage ZT and the detection of the reference voltage TR, and should be proceeded with the counting of the time between the respective occurrences so that the lag time $t_D$ is compared with the pre-established time $t_P$ and alter the total voltage VT proportionally to the lag time $t_D$. As can be seen in FIG. 6 (see indication 65), in this example, the value of the first moment of measurement $t1_0$ is equal to zero, and the pre-established time $t_P$ will be the mean of the defined time $t_D$ of the previous cycle or the mean of the previous cycles.

Another way to embody the voltage detecting circuit 50 may comprise, for example, instead of the fist voltage detecting circuit 51 operating in conjunction with the second voltage detecting circuit 52, to detect the zero level of the voltage ZT and the reference level TR, a pair of circuits similar to the second voltage detecting circuit 52. In this option, it is enough that the reference value of the comparator 56 can simply be adjusted at two different levels, so that the measurement said first and second levels of the voltage $V_{M1}$, $V_{M2}$ can be made at the first and second moments of measurement $t1_0$, $t2_0$ and proceed with the derivative of the measurements and find the proportional network voltage $V_{AC}'$.

As a further way of embodying the voltage detecting circuit 50 to obtain the values of the first and second levels of the voltage $V_{M1}$, $V_{M2}$ at the first and second moments of measurement $t1_0$, $t2_0$, one may foresee the use of a converter D/A. In this solution, the same measurements foreseen in the embodiments described above should be proceed, and the interpretation of the means made by the electronic control central 10 should be adapted, which will receive the digital number corresponding to the measurement made by the converter D/A.

One of the ways of detecting which is the value of the network voltage $V_{AC}$ from the measurement of the first and second voltage levels $V_{M1}$, $V_{M2}$ is that one may opt for storing a table of values foreseen in the electronic control central 10 and from the value of the lag time $t_D$ measured one can conclude which is the value of the network voltage $V_{AC}$.

Figure 7:
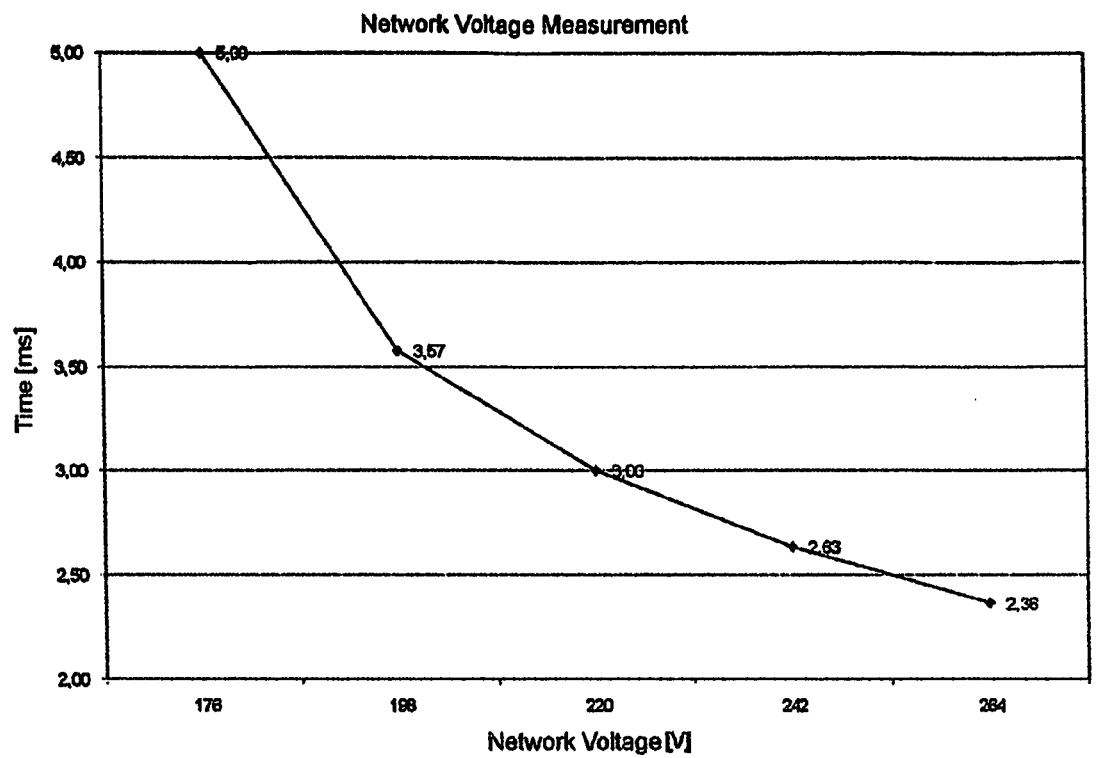
FIG. 7 shows a graph of the lag time of the output signal of the voltage-detecting circuit in function of the variation of the network voltage.

Thus, the second table below may accompany the example of FIG. 7.

| $V_{AC}$ [V] | $t_D$ [ms] |
|---|---|
| 246 | 2.36 |
| 242 | 2.63 |
| 220 | 3.00 |
| 198 | 3.57 |
| 176 | 5.00 |

One can note, in this example, that the value of the pre-established time $t_P$ is of 3.00 ms and the lag time to varying between 2.36 (characterizing overvoltage) and 5.00 (characterizing undervoltage).

The control over the total voltage VT may be made together with the control over the piston voltage $V_P$, supplied by a piston position control. In this way, one can actuate at the same time with an internal control, for example, of a system involving a compressor with a control of the level of the network voltage $V_{AC}$, complementing the systems and resulting in a much more efficient and safe control.

Thus, with the teachings of the present invention, one prevents oscillations in the network voltage $V_{AC}$ from interfering with the situation of the electric motor, which, for instance, might cause mechanical collision of the piston with the top of the cylinder of the linear compressor, thus improving the reliability and the working life of the compressor, besides improving functioning stability of the compressor, preventing loss of efficiency caused by variation in the maximum displacement of the piston.

A preferred embodiment having been described, one should understand that the scope of the present invention embraces other possible variations, being limited only by the contents of the accompanying claims, which include the possible equivalents.

The invention claimed is:

1. An electric motor movement controlling method, the electric motor being fed by a total voltage proportional to a alternate network voltage, the method comprising the steps of:
  making a first measurement of level of the network voltage at a first moment of measurement;
  making a second measurement of level of the network voltage at a second moment of measurement;
  calculating the value of the derivative of the voltage values measured in function of the first and second moments of measurement, to obtain a value of a proportional network voltage; and
  altering the value of the total voltage fed to the motor, proportionally to the value of the proportional network voltage, the total voltage being altered in function of the difference between the value of a proportional network voltage calculated in a present cycle of the network voltage and the value of the proportional network voltage calculated in the previous cycle of the network voltage.

2. A method according to claim 1, characterized in that the value of the total voltage is altered in function of the difference between the value of the proportional network voltage calculated in a current semi-cycle of the network voltage and the value of the proportional network voltage calculated in the previous semi-cycle of the network voltage.

3. A method according to claim 2, wherein the value of the proportional network voltage is obtained from the equation:

$$V_{AC'} = f\left(\frac{\partial V_0}{\partial t}\right)$$

wherein $\partial V_0$ is obtained by subtracting the first and second measurements of level, and the value of $\partial t$ is obtained by subtracting the values of the first and second moments of measurement.

4. A method according to claim 2, wherein after the step of obtaining the value of proportional network voltage one foresees a step of:

measuring the lag time between the occurrence of the measurement of the first moment of measurement and the occurrence of the measurement of the second moment of measurement;

comparing the lag time with a pre-established time;

altering the value of the total voltage proportionally to a value of the proportional network voltage, the value of proportional network voltage being proportional to the lag time, when the lag time is different from a pre-established time.

5. A method according to claim 4, wherein the pre-established time corresponds to the lag time of the previous cycle of the network voltage.

6. A method according to claim 5, wherein the in the step of altering the total voltage the elevation of the total voltage if the lag time is longer than the pre-established time is foreseen.

7. A method according to claim 6, wherein in the step of altering the total voltage the diminution of the total voltage if the lag time is shorter than the pre-established time is foreseen.

8. A method according to claim 7, wherein the value of the total voltage corresponds to a difference between the value of the piston voltage and the value of the proportional network voltage, the value of the piston voltage being previously established.

9. A method according to claim 8, wherein the total voltage feeds an electric motor of a compressor, the compressor comprising a piston.

10. An electric motor movement controlling method, the electric motor being fed by a total voltage proportional to an alternate network voltage, the method comprising the steps of:

measuring the network voltage at a first moment of measurement and at a first level of the network voltage;

measuring the network voltage at a second moment of measurement and at a second level of the network voltage, the first level of the network voltage and the second level of the network voltage having different levels of voltage;

the second moment of measurement being different from the first moment of measurement;

generating a square wave having a transition moment when the second level of voltage has been reached;

measuring a lag time between the between the occurrence of the first level of the network voltage at the first moment of measurement and the transition moment at the second moment of measurement;

comparing the lag time with a pre-established time;

altering the value of the total voltage proportionally to the value of the proportional network voltage.

11. A method according to claim 10, wherein the pre-established time corresponds to the lag time of the previous cycle of a network voltage.

12. A method according to claim 10, wherein the pre-established time corresponds to a mean of lag times of the previous cycles of the network voltage.

13. A method according to claim 11 wherein the value of the proportional network voltage is proportional to the lag time.

14. A method according to claim 13, wherein in the step of altering the total voltage, it is foreseen to raise the total voltage if the lag time is longer than the pre-established time.

15. A method according to claim 14, wherein in the step of altering the total voltage, it is foreseen to lower the total voltage if the lag time is shorter than the pre-established time.

16. A method according to claim 15, wherein the value of the total voltage corresponds to a difference between the value of a piston voltage and the value of the proportional network voltage, the value of the piston voltage being previously established.

17. An electric motor movement controlling system comprising:

an electronic control central, the electric motor is fed by a total voltage controlled by the electronic control central, the total voltage being proportional to an alternate network voltage, the electronic control central including a voltage detecting circuit that comprises a first voltage detecting circuit that detects a first level of the network voltage and a second voltage detecting circuit that detects the second level of the network voltage and the electronic control central being arranged to measure the first level of the network voltage at a first moment of measurement and the second level of the network voltage at a second moment of measurement, the second voltage detecting circuit being arranged to signal the passage of the level of the network voltage at the second level of voltage through a voltage comparator, the voltage comparator generating a square wave having a transition moment, the lag time being measured between the occurrence of the first level of the network voltage and the transition moment, the electronic control central being arranged to calculate the value of the values of the network voltage measured in function of the measurement times measured and obtain a value of a proportional network voltage, the electronic control central being arranged to alter the value of the total voltage to a value of corrected total voltage, proportionally to the value of a proportional network voltage.

18. A system according to claim 17, wherein the first voltage detecting circuit is adjusted to measure the first level of the network voltage at the time of the respective passage by a zero level.

19. A system according to claim 18, wherein the second voltage detecting circuit is adjusted to measure the second level of the network voltage, the second level of the network voltage being located between the zero level of the network voltage and a maximum level of the network voltage.

20. A system according to claim 19, wherein the electronic control central comprises a time counting device that compares the lag time with a pre-established time and to alter the total voltage proportionally to the lag time.

21. A system according to claim 20, wherein the electronic control central is arranged to generate a value of a proportional network voltage, value of voltage being proportional to the value of the lag time, and the electronic control circuit is arranged to alter the value of the total voltage to a value of corrected total voltage proportionally to the value of the proportional network voltage when the lag time is different from the pre-established time.

22. A system according to claim 21, wherein the electronic control central is arranged to raise the value of the total voltage to a value of corrected total voltage if the lag time is longer than the pre-established time.

23. A system according to claim 17, wherein the electronic control central is arranged to lower the value of the total voltage to a value of corrected total voltage if the lag time is shorter than the pre-established time.

24. A system according to claim 23, wherein the total voltage feeds an electric motor of a compressor, the compressor comprising a piston, the electronic control central comprising a value of defined voltage, the defined voltage being proportional to an error between a reference displacement position and a maximum displacement of the piston, the reference displacement position being proportional to the position of the piston in the compressor, and the maximum displacement being proportional to a desirable displacement of the piston in the compressor.

25. A system according to claim 24, wherein the signal generating circuit comprises a D/A converter.

26. A compressor comprising:

an electronic control central, the electric motor is fed by a total voltage controlled by the electronic control central, the total voltage being proportional to an alternate network voltage, the electronic control central including a voltage detecting circuit that comprises a first voltage detecting circuit that detects a first level of the network voltage and a second voltage detecting circuit that detects the second level of the network voltage and the electronic control central being arranged to measure the first level of the network voltage at a first moment of measurement and the second level of the network voltage at a second moment of measurement, the second voltage detecting circuit being arranged to signal the passage of the level of the network voltage at the second level of voltage through a voltage comparator, the voltage comparator generating a square wave having a transition moment, the lag time being measured between the occurrence of the first level of the network voltage and the transition moment, the electronic control central being arranged to calculate the value of the values of the network voltage measured in function of the measurement times measured and obtain a value of a proportional network voltage, the electronic control central being arranged to alter the value of the total voltage to a value of corrected total voltage, proportionally to the value of a proportional network voltage.

* * * * *